Dec. 23, 1969   H. A. SAUER   3,484,946
METHOD AND APPARATUS FOR FREEZE-FREEZE DRYING
Filed Dec. 6, 1967   4 Sheets-Sheet 3

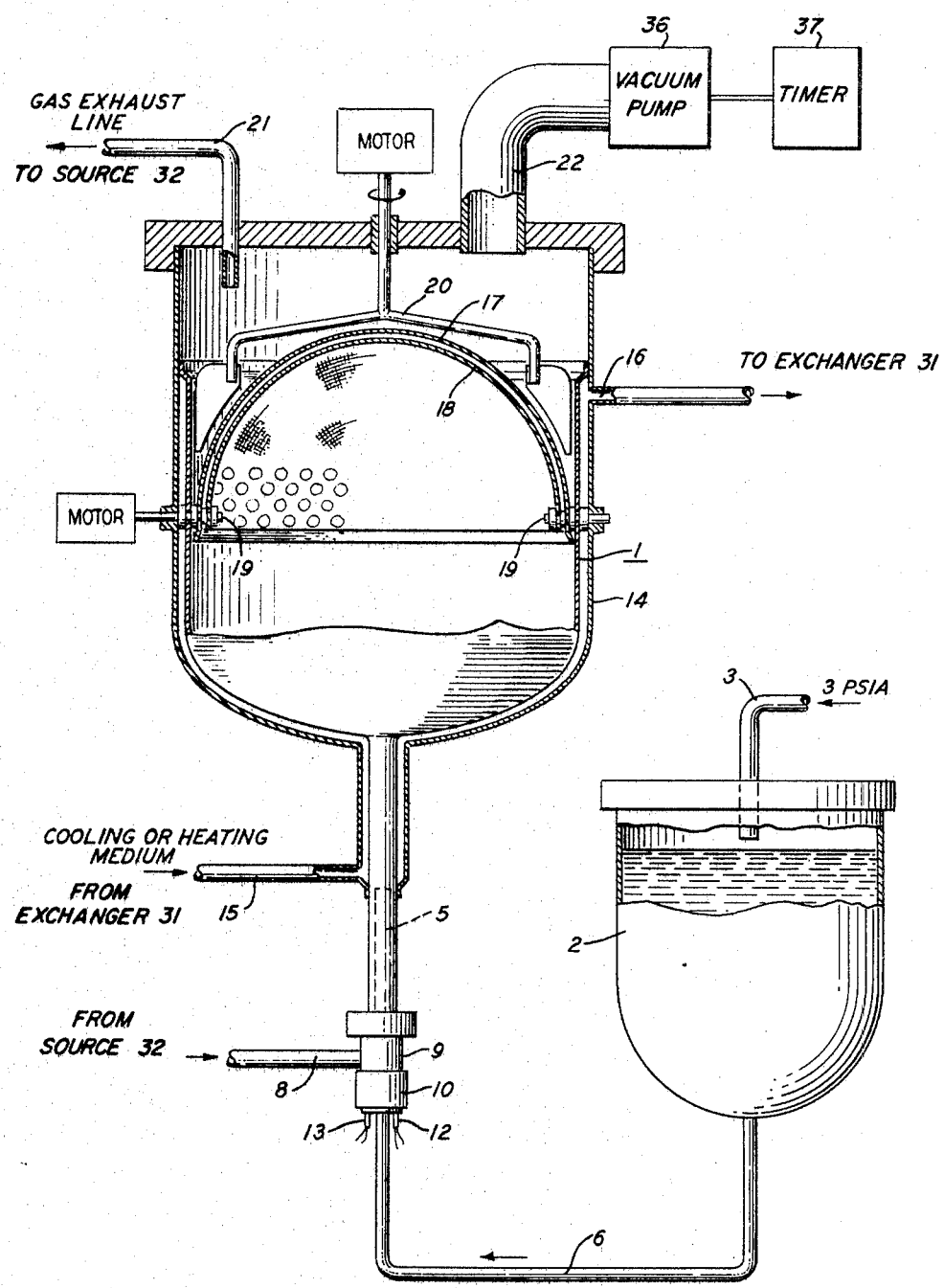

Dec. 23, 1969     H. A. SAUER     3,484,946

METHOD AND APPARATUS FOR FREEZE-FREEZE DRYING

Filed Dec. 6, 1967     4 Sheets-Sheet 4

United States Patent Office 3,484,946
Patented Dec. 23, 1969

3,484,946
METHOD AND APPARATUS FOR FREEZE-FREEZE DRYING
Harold A. Sauer, Hatboro, Pa., assignor to Bell Telephone Laboratories, Incorporated, Murray Hill and Berkeley Heights, N.J., a corporation of New York
Filed Dec. 6, 1967, Ser. No. 688,430
Int. Cl. F26b 5/06
U.S. Cl. 34—5                                   18 Claims

ABSTRACT OF THE DISCLOSURE

Moisture-containing substances, particularly aqueous salt solutions, preparatory to freeze-drying are frozen by introduction into the lower region of a body of nonmiscible refrigerant having a molecular density greater than the substance. A suitable freeze and freeze-drying chamber for practicing this process includes a set of wire mesh baskets which collect the frozen substance and thereafter in the drying step slowly rotate to promote uniform drying. Primary drying is effected at atmospheric pressure. Purging of residual moisture, if slight enough, is achieved by repeated pressure excursions back and forth across the vapor boundary at increasing temperatures in the presence of a drying gas.

BACKGROUND OF THE INVENTION

Field of the invention

This invention is concerned with lyophilization processes in general and more particularly with novel procedures that result in improved processing time and product quality. An immediate application of the invention involves the freezing and freeze-drying of droplets of aqueous solution.

Description of the prior art

Freeze-drying, or lyophilization, involves the removal of moisture from a material through sublimation. The usual basic steps are to quick-freeze the material, lower the ambient pressure to permit the frozen moisture to vaporize, provide heat of sublimation, and draw off and dispose of the vapor.

In the copending joint applications of Monforte-Schnettler, Ser. Nos. 629,629 and 629,788, both filed on Apr. 10, 1967, and assigned to applicant's assignee, there is described the discovery that freeze-drying of an atomized drop of, for example, an aqueous salt solution, results in a highly desirable close physical and compositional control of a final particulate product.

In the practice of the freeze-drying processes therein described, several specific problems are encountered for which freeze-drying techniques of the prior art offer no ready answers. For example, the excellent structural uniformity of the particulate matter prepared in accordance with the teachings of these patent applications is dependent in major respect upon the uniformity of size of the atomized droplets of solution. For many uses, this requirement of structural uniformity is becoming near absolute. It has become evident that present techniques for atomizing the solution and placing same into the refrigerant do not achieve the desired control of droplet size and uniformity.

A further problem in the freezing-drying of solution droplets, one closely related to droplet size and uniformity, is the adaptability of the process to continuous operation. If, for example, it is necessary to interrupt the introduction of solution into a refrigerant, so as to collect the solution already frozen, the entire process is obviously less viable commercially.

An added shortcoming of processes practiced with the freeze-drying of droplets, which is also a drawback broadly characteristic of most freeze-drying methods, relates to the inordinate length of time required to effect complete drying. Conventionally, the drying step involves a relatively static application of heat of sublimation while keeping the frozen article under a pressure reduced sufficiently to assure that the liquid phase cannot occur. For many lyophilized materials the moisture content at the conclusion of the sublimation phase is about 10%. Reduction of moisture content to approximately 1% is carried out by a series of complex operations termed dehydration. This purging of residual moisture in the final drying state of prior art processes has been especially difficult and time-consuming.

Moreover, as is well known, the vapor released in the freeze-drying typically is drawn off to an external condenser where it is collected as ice on condenser plates. Those large external vapor traps with the least amount of downtime are expensive and burdensome to operate, and until the present invention have lacked a practical alternative.

Accordingly, one object of the invention is to substantially hasten the drying time for freeze-drying operations.

An added object of the invention is to eliminate the need for high capacity external condensers in a freeze-freeze drying plant.

A further and more specific object of the invention is to effect more perfect control over granular size of particulate bodies prepared through the freeze-drying of a size-controlled droplet of salt solution of that body.

A further specific object of the invention is to freeze and freeze-dry droplets of solution in a continuous process.

SUMMARY OF THE INVENTION

These and other objects are achieved in accordance with one aspect of the invention through a process characterized broadly by introduction of the moisture-containing substance into a relatively confined vertical lower portion of a body of nonmiscible refrigerant of greater molecular density than said solution.

Where the substance is a solution, the diameter and therefore the size of each droplet formed is finely controlled by injecting the solution under pressure through a small diameter tube directly into the refrigerant. The orifice may be varied to produce any size sphere; and a plurality of injectors may be used. The droplets are frozen during their ascent and are collected within the chamber by a fine mesh screen. Alternatively, for continuous operation, the frozen droplets are skimmed off and fed to one of at least two further separate chambers for the drying step.

Pursuant to another facet of the invention, the primary drying is achieved by subjecting the frozen material, at atmospheric pressure, to a circulating gas such as dry air or dry nitrogen, the initial temperature of which is often but not necessarily the same as the refrigerant temperature. During this step, the capturing screen serves as a rotating container for gently agitating the frozen substance to promote drying speed and uniformity. The gas temperature is slowly increased to just below the melting point of the frozen solution, say −5 degrees C., and thereafter this temperature is maintained until the substance is virtually dry. In general, the advantage of effecting sublimation at atmospheric pressure rather than in a vacuum is simplification of drying facilities and operation. Additionally, if air is used, it and its moisture content can be discharged without resort to condensers.

Residual solvent, if sufficiently slight, can then be removed in accordance with a further aspect of the invention characterized by "atmospheric pumping" as distinguished from the mere application of vacuum. The essential feature of this phase of the process involves subjecting the residual moisture-containing substance to a circulating moisture-free drying gas whose pressure varies cyclically in a range that at the specific gas temperature of a given cycle and for each cycle, includes a solid-gaseous phase transition or a liquid-gaseous phase transition. The basic aim of these repeated pressure variations essentially is to in effect pump out the residual moisture from the porous substance during the return leg to the higher vacuum. In one specific application of this aspect of the invention, the initial temperature is set a few degrees C. below the freezing point of the residual moisture at atmospheric pressure, and the drying gas pressure is reduced to 1 or 2 mm. Hg while the temperature is held virtually constant. During this leg, residual moisture is sucked or drawn from the material along with the drying gas. Next, the temperature is raised a small amount, for example 5 degrees C., the time interval principally depending upon the size, density and thermal conductivity of the material, during which the pressure rises slightly in accordance with classic gas laws. Finally, by the introduction of excess drying gas the pressure is increased, for example, to atmospheric; and it is in this part of each cycle that trapped moisture is acquired by the penetrating gas. The cycle is then repeated as desirable at incremental temperatures until the material is thoroughly dry.

A familiar problem during the primary drying of many materials is the surface crustation impeding removal of residual vapor. In the practice of this invention, surface crustation seriously impedes penetration of the drying gas to remove vapor. Crustation is minimized or avoided, however, in carrying out the primary drying step of the present invention by imparting a controlled low moisture content to the circulating drying gas. Then, in the second stage involving atmospheric pumping, a moisture-free drying gas is used, if, as in the embodiment illustrated below, the material is a salt or other inorganic substance such as disclosed in the aforementioned two Monforte-Schnettler applications. If the material is an organic compound, such as many foodstuffs, it is usually necessary to maintain drying gas moisture content control throughout. During this stage, ejection of the moist gas from the porous interstices of the material aids in minimizing or preventing surface crustation.

The conventional static freeze-drying techniques typically require approximately 36 hours to completely purge the residual moisture from, say, a metallic salt. In contrast, it has been found that the atmospheric pumping process of the present invention reduces this time to approximately 12 hours. It is, of course, understood that the parameters of cycle time, pressure excursions, cycle repetitions and starting and finishing temperatures will vary depending upon the characteristics of the material and its moisture, thus influencing the drying time. The specifics for a given case obviously may be determined experimentally. The starting point is a recognition that the residual moisture is insufficient in amount to cause significant harm to the containing body and be purged as vapor from its liquid state.

Further, the starting point of the dynamic atmospheric pumping technique may occur at the conclusion of a conventional lyophilization procedure in order to remove the residual moisture usually attendant with this procedure.

It should be apparent that the described atmospheric pumping technique is particularly advantageous with lyophilization of temperature-sensitive materials because of the reduction in final drying temperature it affords. In all cases, the shortened final drying time is beneficial.

The invention, its further objects, features and advantages will be more fully understood from a reading of the description to follow in conjunction with the drawing.

BRIEF DESCRIPTION OF THE DRAWING

FIGS. 1A and 1B are schematic diagrams of apparatus used in the practice of the inventive processes;

DETAILED DESCRIPTION OF AN ILLUSTRATIVE EMBODIMENT

Practice of the inventive process in one form requires essentially a vessel of refrigerant with an entrance thereto at or near the bottom of its mass. Where needed, the same vessel advantageously may include internal wire mesh forms to capture and contain the frozen droplets. At the bottom entry port, droplets of solution are controllably ejected under pressure into the refrigerant where owing to the higher density thereof, the droplets ascend. The same chamber with suitable manipulation of the wire mesh advantageously may be used to dry the droplets, first, by the application of a drying gas through the chamber at atmospheric pressure and, second, to remove residual water by the application of successive pressure excursions at incremental temperatures in accordance with that facet of the invention.

Figure 1B:
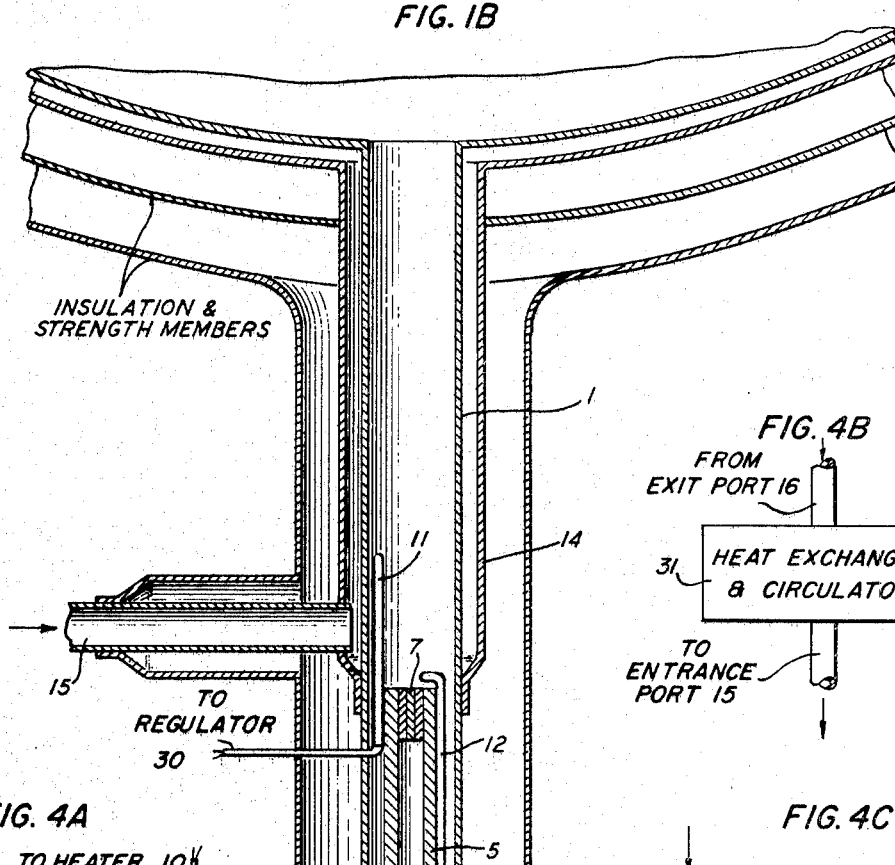

FIGS. 1A and 1B illustrate one suitable vehicle for the practice of the inventive process. Shown there is a unitary freeze-freeze drying chamber designated 1 supplied with a salt solution, which in the present example is that described in the aforementioned two Monforte-Schnettler applications, or other solution from a bath 2 maintained under pressure by any convenient means such as pressure line 3. The interior of chamber 1 is lined to contain a refrigerant such as Freon E1. As best seen in FIG. 1B, a bottom extension of chamber 1 defines a drain channel 4 in which, pursuant to the invention, is mounted an elongated solution injector 5 connected to the solution in bath 2 through suitable piping 6. In its upper end is mounted a tube 7 consisting of a stainless steel tube whose diameter may be as little as 1 mil.

Figure 4A:
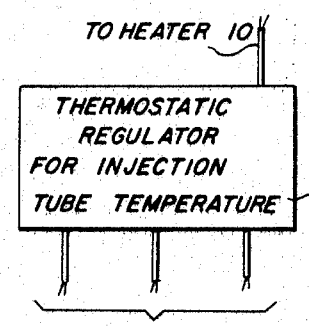
FIGS. 4A, 4B and 4C are block diagrams of items of equipment ancillary to the apparatus shown in FIGS. 1A and 1B.

The bottom of channel 4 terminates at an inlet duct 8 which serves both as a refrigerant drain and an entry point for temperature controlled drying gas as will be described. The injector mounting member 9 is partially enveloped in a heater 10. The region of refrigerant between the outlet of tube 7 and approximately 1″ above same must be carefully temperature controlled to avoid coalescing of the droplets when ejected. Similarly, in order to prevent the solution's stream in injector 5 from freezing the injector body is temperature controlled. Accordingly, at the orifice of tube 7 the temperature is maintained just above the freezing point of the solution, but about 1″ above, the refrigerant temperature is well below the freezing point of the solution. These controls are achieved through a regulator 30 shown in FIG. 4A, which receives inputs monitoring thermocouples 11 and 12 suitably placed in the critical region, as well as thermocouple 13 which is the heater control. The output of regulator 30 is coupled to heater 10. Thus, a sharp temperature gradient just above the capillary outlet results in prevention of coalescing.

Figure 4B:
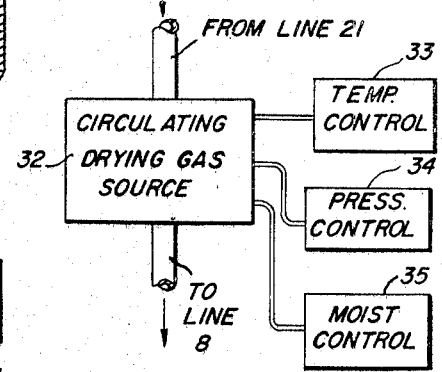

Surrounding the refrigerant chamber 1 is a thin gas envelope 14 which extends to a point just above the level of tube 7. At this point an entrance port 15 is connected to envelope 14 for the supply of cooling or heating medium from a suitable heat exchanger and circulator 31 shown in FIG. 4B. Envelope 14 substantially surrounds the body rects the heat exchange medium to suitable recovery facilities that are conventional in the art. Conventional pressure-resisting and insulative structure outwardly of of refrigerant; and is connected to an exit port 16 that di- envelope 14 must be provided, as shown in FIG. 1B.

Two hemispheric screens, outer screen 17 and interior screen 18, are centrally mounted within chamber 1 on a horizontal rotating axis 19. Through any suitable linkages, outer screen 17 is adapted to be rotated downwardly 180 degrees to form a spherical closure. During the freezing step a uniform temperature in the chamber proper is promoted by gentle agitation of the refrigerant through a rotating paddle mechanism 20. A gas exhaust line through the top of chamber 1 leads to conventional recovery facilities for reprocessing of this gas if desirable. Also feeding chamber 1 is a vacuum line 22 through which chamber 1 may be evacuated to pressures in the vicinity of 1 millimeter of mercury.

In practicing the freezing stage of the inventive process, the solution to be frozen is forced under controlled pressure of for example 3 p.s.i.a. from bath 2 and into injector 5 where at the tube 7 droplets of solution are formed and injected into the neck region of the refrigerant. Their diameter is principally dependent on the diameter of the tube 7 and the solution pressure. Coalescing of the successively produced droplets is avoided pursuant to one facet of the invention by the described continuous monitoring of the refrigerant temperature in the capillary region as well as adjacent injector 5, and through adjustments of the heat supplied by heater 10 and the heating medium such as nitrogen gas introduced through port 15.

Since the droplets of solution are less dense than the refrigerant, the droplets ascend through the refrigerant and upwardly where they collect at the upper surface of the refrigerant on the concave side of partially immersed screen 18. The drying process may be practiced within chamber 1 by rotating outer screen 17 180 degrees, draining the refrigerant out duct 8, and applying through duct 8 a drying gas such as air or nitrogen at the temperature of the refrigerant which typically is −40 degrees C.

The screens 17, 18 are slowly rotated around axes 19 while a moderate flow of dry gas, for example dry air or dry nitrogen, is passed through the drying vessel between inlet 8 and exhaust 21. The gas temperature is initially at the temperature of the refrigerant, and the pressure inside the chamber is maintained at near atmospheric. The gas temperature is then slowly increased to approximately −5 degrees C. which is a little below the slightly depressed freezing point of water, and there maintained until the frozen droplets are virtually dry.

Figure 4C:
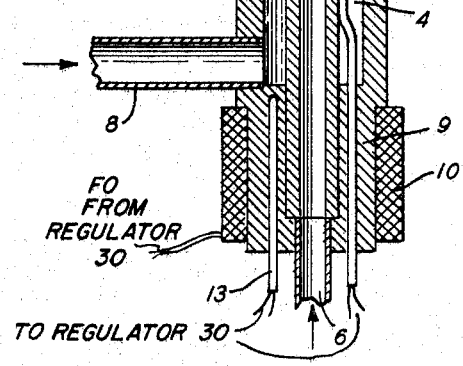

In accordance with a further facet of the invention this residual water, if determined to be sufficiently slight, may be removed in a surprisingly short time relative to other known methods by the described atmospheric pumping procedure. Its practice calls for the controlled application of heat in envelope 14 as well as to the drying gases entering through port 15 by conventional apparatus including a gas source 32 with temperature control 33, pressure control 34, and moisture content control 35, all of which are depicted in block diagram form in FIG. 4C. Additionally, the required negative pressure excursions are effected by vacuum pump 36 operating with timer 37 and connected to the interior of chamber 1 by vacuum line 22.

It is important to reiterate that, in the practice of this phase of the inventive process, the residual water remaining in the almost dry material actually transits back and forth between the gas and liquid states. It therefore is important that a liquid stage will not be deleterious to the end product. The final highest temperature reached in practicing the above procedure is often the safe maximum temperature for the material in question.

Figure 2:
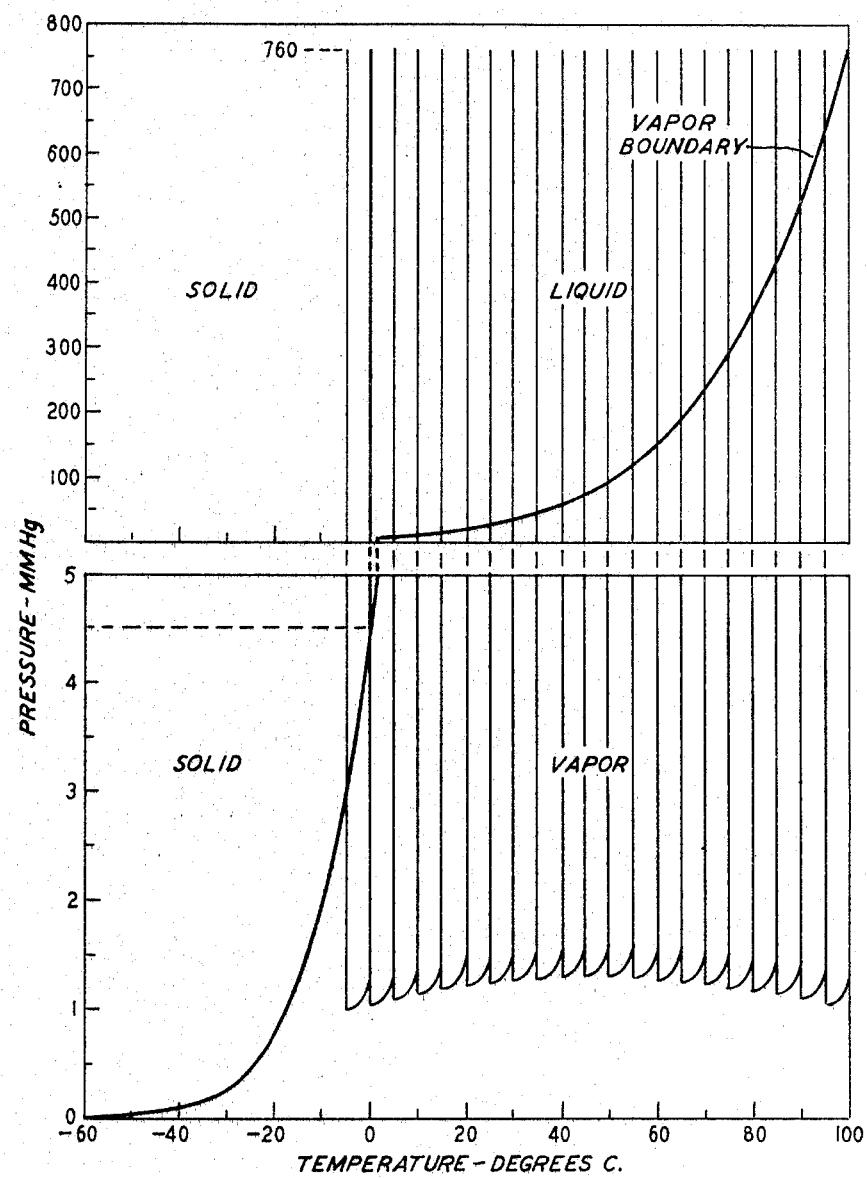
FIG. 2 is a phase diagram for water, with superimposed traces illustrating the atmospheric pumping.

By way of further illustration, FIG. 2 is a phase diagram for water, upon which has been superimposed traces of the cycling steps to which, in accordance with the invention, the water is subjected. As noted above, the pressure in chamber 1 is lowered from atmospheric of approximately 760 mm. Hg to a pressure well below the vapor boundary, say, approximately 1 millimeter of mercury, while temperature is maintained at the initial level of approximately −5 degrees C. The attainment of this degree of vacuum may take of the order of five minutes. Then, the temperature is raised approximately 5 degrees during which time—about ten minutes—the pressure increases slightly. At this point, dry gas at the terminal temperature of the step namely zero degrees C. is introduced into chamber 1 through inlet duct 8 so that atmosphere pressure is restored in the vessel in a relatively brief period, say 30 seconds. During this step, the moisture-free drying gas is swept into the porous material being dried, and acquires residual moisture trapped in the material. The pressure then is again lowered below the vapor boundary at the corresponding temperature of, in this case, zero degrees C. evacuating the moist gas from the porous spheres, and the cycle is repeated until the maximum temperature required for complete drying of the material is attained.

Depending on the characteristics of the material being dried, the cycle parameters will vary, including for example, the starting temperature, the temperature increments, the extent of vacuum applied, the duration of the substeps and the maximum temperature allowed in the process. All may require tailoring for a given material. The time for a complete cycle and for each of its legs is not important thermodynamically and for commercial reasons may be as short as available equipment will allow. Similarly the temperature rise need not be in steps but can be continuous over the number of cycles applied; and further, can be linear or nonlinear with time to suit the specific materials. Moreover, for those materials which due to denaturation problems cannot be dried by any process above a temperature of −30 degrees C. or so, the atmospheric pumping must and can be performed below this temperature. The important innovation that substantially hastens the drying procedure is the cyclic pumping action generated by the successive applications of moisture-free drying gas and of vacuum under controlled temperature conditions in accordance with the invention.

The product resulting from the inventive freeze-drying process exhibits exceedingly great structural uniformity which is the desired objective for starting point material in, for example, the preparation of ferrites and other oxidic materials.

The basic inventive step of injecting articles to be frozen into the bottom of a body of denser refrigerant may be carried to further advantage by pulling out the frozen articles as they reach the refrigerant's surface and transferring them to a separate freeze drier. In this fashion, injection of the solution or other matter to be frozen may continue uninterrupted. This further step is illustrated in FIG. 3 in which like numerals denote the same elements as appeared in FIG. 1.

Figure 3:
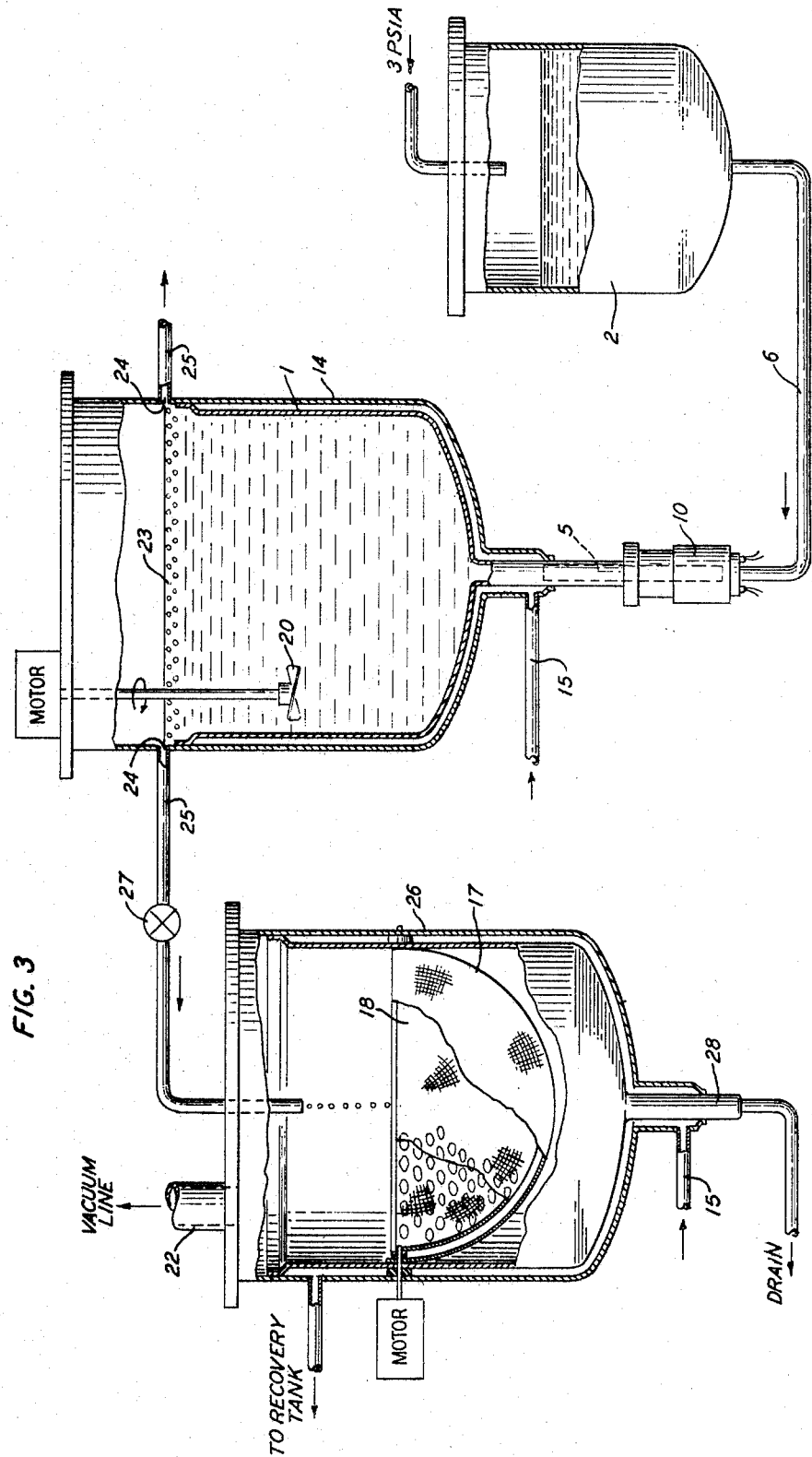
FIG. 3 is a schematic diagram of apparatus used in continuous operation of the process.

In FIG. 3, the chamber 1 is fed with solution from a bath similar to bath 2 of FIG. 1 through pipe 6 and injector 5 the construction of which advantageously is identical to that described earlier in reference to FIG. 1. A rotary paddle 20 gently agitates the refrigerant to maintain uniform temperatures throughout, and gaseous heat exchange medium from inlet 15 is circulated in the envelope 14 as earlier described with respect to FIG. 1. The solution droplets ascend through the denser refrigerant, but instead of collecting on a screen or mesh, are allowed to accumulate on the surface of the refrigerant as frozen droplets 23.

In accordance with this facet of the invention, outlet ports such as 24 are added to the vertical aspect of chamber 1 at the level at which the surface of the refrigerant is to be maintained. Outlet ports 24 are in effect one end of a transfer channel 25 which is suitably insulated by known means so that the passage of refrigerant with frozen droplets therein is made without a change in temperature. Numerous such channels 25 may be provided leading from the freezing chamber 1 in rosette fashion; but at least two must be present in order that the freezing step may operate continuously. Each channel 25 terminates in the interior section of a freeze drier 26. There, the frozen droplets and overflow refrigerant are collected on the interior side of an inner screen 18 identical to that shown in FIG. 1. Inner screen 18 in similar fashion is surrounded by an outer screen 17 which may be rotated 180 degrees to form a spherical container for the frozen droplets. The temperature in freeze drier 26 is of course maintained at the temperature of the refrigerant through the application of gaseous heat exchange media to envelope 14 via ports 15 in a manner similar to that described with respect to the freeze-drying unit of FIG. 1. The overflow refrigerant passes through the screens 17, 18 and out the bottom drain 27 of the drying unit 26. A vacuum line 22 is connected to the drying chamber, and means are provided for introducing a temperature controlled drying gas to and through the drier 26.

Importantly, the level of the refrigerant in chamber 1 of FIG. 3 is maintained at all times so that droplets 23 or the like can be floated into and out of ports 24. Numerous methods and sensing means exist to insure this condition.

The continuous operation of the process practiced by the illustrative equipment shown in FIG. 3 is achieved by filling one of the at least two freeze driers 26 through opening of a suitable valve such as 27, while performing the freeze drying operation in the companion drier or driers 26. Thus, the droplets or other material constantly being frozen in chamber 1 may be paddled or otherwise suitably directed into any one of the at least two transfer channels 25 while the remaining transfer channels are blocked off so that within the freeze driers 26 served by them, the drying of the particles previously loaded can progress.

In each drier 26 during the drying, the spherical mesh container for the particles is slowly rotated. In addition, advantageously, the atmospheric pumping for removal of residual water that was earlier described can also be practiced in the freeze driers 26 in precisely the same fashion set forth above.

It is to be understood that the embodiments described herein are merely illustrative of the principles of the invention. Various modifications may be made thereto by persons skilled in the art without departing from the spirit and scope of the invention.

What is claimed is:

1. Process for the removal of residual moisture in a freeze-drying operation characterized in that the frozen substance is subjected to a drying gas whose pressure varies at successively higher temperatures cyclically between a pressure at which the residual moisture exists as a solid or a liquid to a pressure below the moisture vapor boundary.

2. Process of claim 1 in which the negative peak pressure of each cycle is maintained for a set time, during which time the temperature of said gas is increased at a prescribed amount.

3. Process of claim 2 wherein the starting temperature is less than the freezing point of the solution at atmospheric pressure.

4. Process of claim 3 wherein each negative-going pressure excursion occurs in a time of about five minutes, each negative pressure peak occurs at about 1 mm. Hg and is maintained for a period of about ten minutes and the pressure is then returned to its positive-most value within about ten to thirty seconds.

5. Process for making particulate matter comprising freezing a solution of a solute system capable of yielding said matter in a fluid which is substantially immiscible with said solution and removing the solvent by sublimation, characterized in that the fluid is a liquid molecularly denser than the solution, in that the solution is injected under pressure into the liquid in successive droplets of substantially uniform diameter, and in that the liquid temperature at the point of injection is maintained minimally above the freezing temperature of the solution and slightly above the injection point undergoes a sharp negative temperature gradient.

6. Process of claim 5 in which the removal of residual solvent is characterized in that the frozen matter is subjected to a circulating drying gas whose pressure varies cyclically between substantially atmospheric pressure to below the solvent vapor boundary, each successive low pressure excursion occurring at a substantially uniformly higher temperature than the preceding excursion.

7. Process of claim 6 in which said circulating drying gas is controlled as to moisture content during removal of residual solvent.

8. Process of claim 5 in which the low pressure excursion takes place within a period of the order of five minutes.

9. Process of claim 5 in which the low pressure point of each cycle, once reached, is maintained for a period of the order of ten minutes, during which the system temperature is increased a prescribed uniform amount.

10. Process of claim 5 in which the starting temperature is less than the freezing point of said solution at atmospheric pressure and the temperature increments are about 5 degrees C.

11. Dried particulate matter produced in accordance with the process of claim 6.

12. Freeze-drying apparatus comprising: a chamber containing a body of refrigerant having greater molecular density than the substance to be freeze-dried, means for introducing said substance into the lowermost region of said refrigerant body so that the substance ascends through said body and is frozen in the ascent, and means for capturing and containing the frozen substance while suspended in said refrigerant body comprising an inner and an outer mesh conjunctionally inverted in said body, the inner mesh collecting the ascending frozen substance on its concave side, and means for rotating the outer mesh 180 degrees thereby forming a closure for substance so collected.

13. Apparatus in accordance with claim 12 further comprising means for draining the refrigerant from said chamber, means for controlling the temperature and pressure of the drying medium introduced in said chamber for removal by sublimation of frozen moisture, and means for rotating said closure, thereby to expose said substance uniformly to the drying medium.

14. Apparatus in accordance with claim 12 further comprising at least two drying vessels exterior of said chamber, means for transferring batches of frozen substance from said chamber to a selected one of said drying vessels, and means for freeze-drying the transferred substance in each said vessel.

15. Apparatus in accordance with claim 14 wherein said transfer means between said chamber and each said vessel comprises a refrigerated conduit for conducting a flow of refrigerant and frozen substance from the first conduit end disposed through said chamber at the level of the refrigerant surface therein to the second conduit end connected through the top of a respective said vessel.

16. Apparatus in accordance with claim 15 wherein each said vessel comprises means for capturing and containing the frozen substance deposited therein while expelling the overflow refrigerant, and means for slowly rotating the containing means during said freeze-drying.

17. Apparatus in accordance with claim 12 further comprising means for maintaining a sharp negative refrigerant temperature gradient between the point of injection, at which the refrigerant temperature is minimally above the freezing temperature of the solution, and the remainder of the refrigerant.

18. Apparatus in accordance with claim 17 wherein said solution is an aqueous salt solution.

(References on following page)

References Cited

UNITED STATES PATENTS

| | | | |
|---|---|---|---|
| 2,751,762 | 6/1956 | Colton | 62—67 |
| 3,079,761 | 3/1963 | Toulmin | 62—123 |
| 3,255,534 | 6/1966 | Kan | 34—5 |
| 3,262,212 | 7/1966 | De Buhr | 34—5 |
| 3,263,335 | 8/1966 | Kan | 34—5 |
| 3,269,025 | 8/1966 | Dryden | 34—5 |
| 3,297,454 | 1/1967 | Webster | 62—64 |
| 3,299,525 | 1/1967 | Thuse | 34—92 |
| 3,313,032 | 4/1967 | Malecki | 34—5 |

WILLIAM J. WYE, Primary Examiner

U.S. Cl. X.R.

34—92; 62—67, 123